United States Patent [19]

Licci et al.

[11] Patent Number: 4,622,159
[45] Date of Patent: Nov. 11, 1986

[54] METHOD FOR THE PREPARATION OF FINE HEXAGONAL FERRITE POWDERS, IN PARTICULAR, FOR MAGNETIC RECORDING

[75] Inventors: Francesca Licci; Stefano Rinaldi, both of Parma; Tullo Besagni, Trecasali-Parma, all of Italy

[73] Assignee: Consiglio Nazionale Delle Ricerche, Italy

[21] Appl. No.: 784,245

[22] Filed: Oct. 4, 1985

[30] Foreign Application Priority Data

Oct. 12, 1984 [IT] Italy ............................. 40095 A/84

[51] Int. Cl.$^4$ ............................................. C04B 35/26
[52] U.S. Cl. ......................... 252/62.63; 252/62.56; 252/62.64; 148/14; 148/100; 264/125
[58] Field of Search ............... 252/62.56, 62.63, 62.64; 148/14, 100; 264/125

[56] References Cited

U.S. PATENT DOCUMENTS

| | | | |
|---|---|---|---|
| 4,120,806 | 10/1978 | Watanabe et al. | 252/62.63 |
| 4,120,807 | 10/1978 | Watanabe et al. | 252/62.63 |
| 4,341,648 | 7/1982 | Kubo et al. | 252/62.63 |
| 4,411,807 | 10/1983 | Watanabe et al. | 252/62.63 |
| 4,425,250 | 1/1984 | Hibst | 252/62.63 |
| 4,493,779 | 1/1985 | Kamiyama | 252/62.63 |
| 4,493,874 | 1/1985 | Kubo et al. | 252/62.63 |
| 4,543,198 | 9/1985 | Kamiyama | 252/62.63 |
| 4,565,726 | 1/1986 | Oguchi et al. | 252/62.63 |
| 4,569,775 | 2/1986 | Kubo et al. | 252/62.63 |

Primary Examiner—Stephen J. Lechert, Jr.
Attorney, Agent, or Firm—Darby & Darby

[57] ABSTRACT

The method disclosed by which to prepare fine hexagonal ferrites for use in magnetic recording, is one which consists basically in dissolving (a) carbonates or other soluble compounds of an alkaline earth metal such as strontium or barium, (b) a carbonate or other soluble compound of cobalt, and (c) titanium trichloride, all in a solution of ferric citrate and water, whereupon a polycondensation is brought about by addition of ethylene clycol, and heat is applied to eliminate the water and organic matter from the compound. Addition of the alkaline earth metal, the cobalt and the titanium is proportioned precisely on the basis of the stoichimetric properties of the end-product, the formula for which is $$ReO.(6-x)Fe_2O_3.xCoO.xTiO_2$$

where x is the extent to which cobalt and titanium atoms replace iron atoms and Re is the alkaline earth metal. Final application of heat produces crystallization of the superfine hexaferrite particles.

11 Claims, 3 Drawing Figures

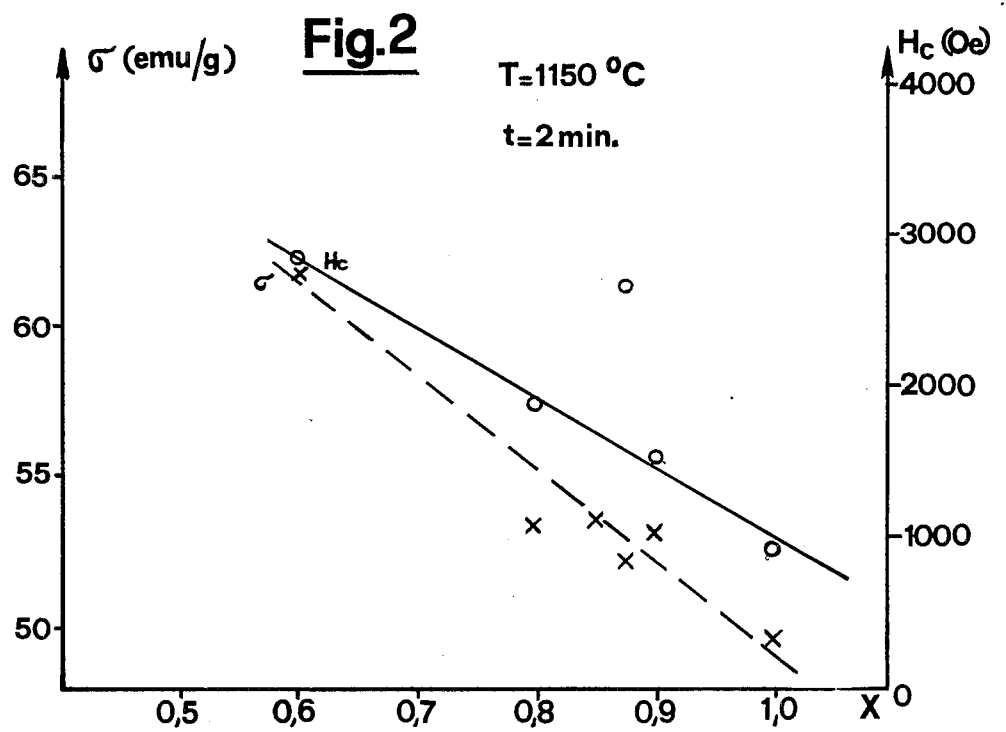
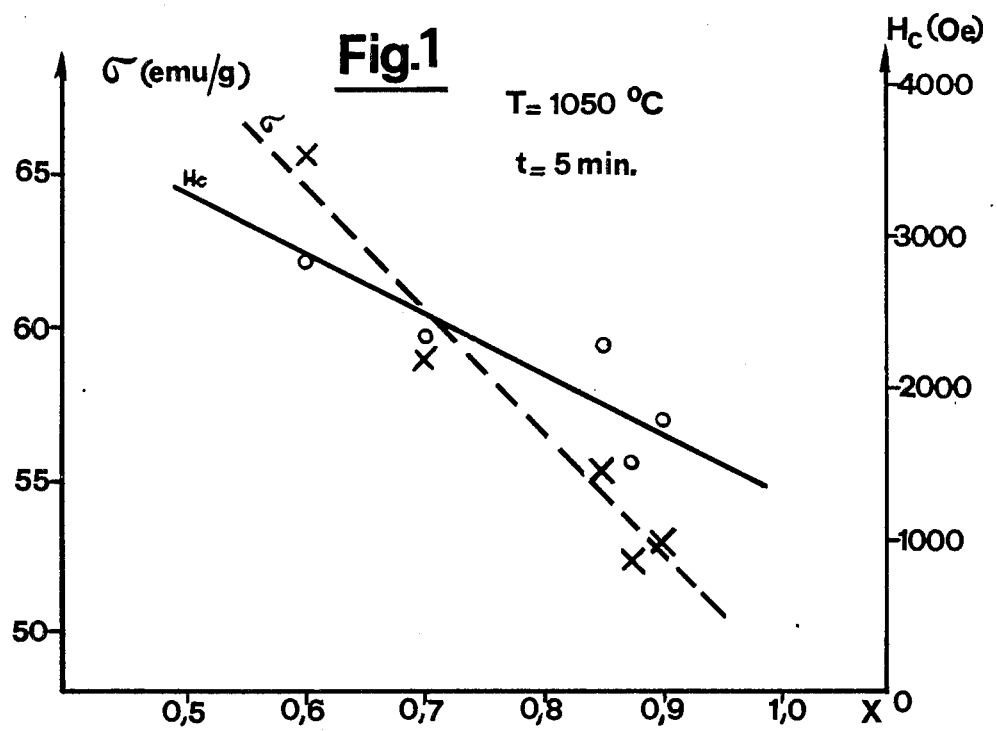

METHOD FOR THE PREPARATION OF FINE HEXAGONAL FERRITE POWDERS, IN PARTICULAR, FOR MAGNETIC RECORDING

BACKGROUND OF THE INVENTION

The invention relates to a method for the preparation of fine hexagonal ferrite powders, destined in particular for magnetic recording.

Hexagonal ferrites (hexaferrites) are ferrimagnetic materials having a general chemical formula:

$$AReO \cdot BMeO \cdot CFe_2O_3$$

where:
- A, B and C are stoichiometric indices which vary with the different hexaferrite phases (denoted generally by capital letters M, Y, W, Z and c.);
- Re is usually an alkaline earth metal such as barium or strontium; and
- Me is a divalent transition metal which, apart from iron, might be zinc, cobalt, copper, manganese, magnesium or nickel.

The magnetic properties of this particular class of materials render them suitable, either in their normal state or appropriately doctored, for a great number of applications; one such application of significant interest is that of magnetic recording.

Reference is made throughout the description to a hexaferrite in the M phase, where A=1, B=0 and C=6, thus producing a chemical formula $$ReO \cdot 6Fe_2O_3$$

It will be observed, nonetheless, that the method as disclosed can be applied with hexagonal ferrites in different phases, that is, having different stoichiometric indices.

The object of the method disclosed is to permit of obtaining hexaferrites the physical and the magnetic properties of which -viz, the dimensions of the powdered particles, uniformity of the compound, anisotropy, coercivity, magnetization and c., can be controlled with ease, thereby making it possible to engineer values for the single properties as near as possible to the optimum values effectively required, these being dependent on the ultimate application of the single hexaferrite product.

An advantage of the method is that it permits of obtaining a hexaferrite precursor featuring uniformity of atomic structure and enabling formation of the end product (the hexaferrite) at low temperature applied for a relatively short duration, in such a way as to extract finer particles and generally enhance the granulometry of the powder.

SUMMARY OF THE INVENTION

The stated object and the aforesaid advantage, and other advantages besides, are realized with the method disclosed herein, which is characterized in that it envisages the following steps:
- preparation of a solution of ferric citrate in water having an excess of citric acid over iron;
- addition of a soluble compound of an alkaline earth metal in stoichiometric proportion determined by the stoichiometry of the end-product;
- addition of a soluble compound of cobalt in stoichiometric proportion determined by the stoichiometry of the end-product;
- addition of a soluble compound of titanium in stoichiometric proportion determined by the stoichiometry of the end-product;
- a first application of heat at below 100° C. by means of which to eliminate unwanted by-products;
- addition of ethylene glycol in a proportion of 10% by volume (approx) of the solution with the resultant formation of organic macromolecules having chemically bonded inorganic ions;
- a second application of heat to bring about total dehydration and resultant formation of a solidified mass possessing the same cationic composition and the same chemical uniformity as the original solution;
- a third application of heat at between 400° ... 450° C., bringing about total elimination of the organic part of the solidified mass; and
- a final application of heat by means of which to induce crystallization of the hexaferrite.

BRIEF DESCRIPTION OF THE DRAWINGS

A possible version of the basic method will now be described in detail. Reference is made to the accompanying graphs of FIGS. 1, 2 and 3 which illustrate the magnetic properties of the end-product in relation to its stoichiometric composition and to the duration and temperature of the final application of heat.

DESCRIPTION OF A PREFERRED VERSION OF THE METHOD

Figure 3:
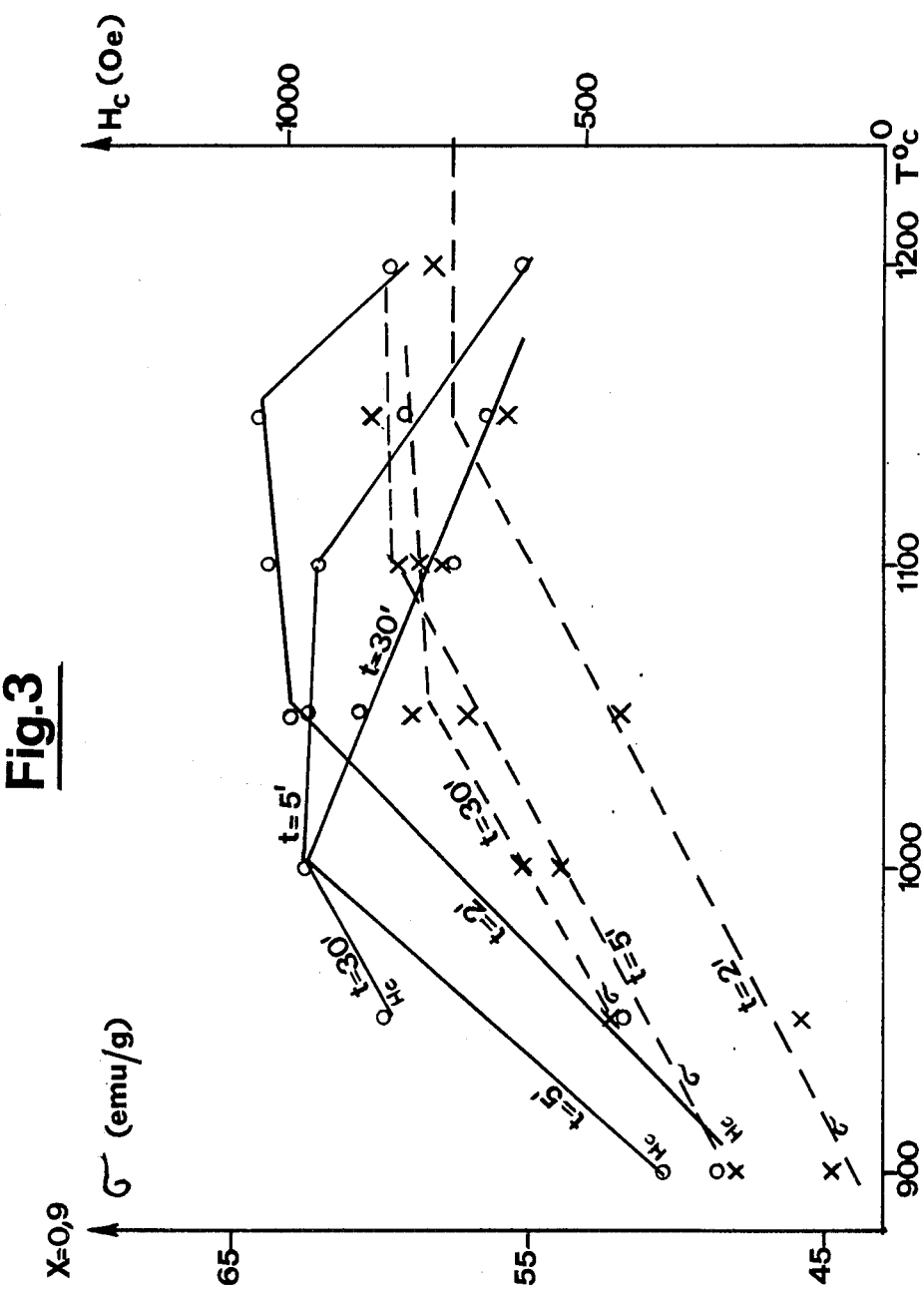

The object of the method described herein is that of obtaining a hexaferrite in which the iron is partly substituted in isoelectronic fashion by cobalt plus titanium, according to the following equation $$2Fe^{3+} \longleftrightarrow (Ti^{4+} + Co^{2+})$$

thereby obtaining a hexaferrite with the formula $$ReO \cdot (6-x)Fe_2O_3 \cdot xCoO \cdot xTiO_2$$

or in more general terms, where it may be wished to obtain hexaferrites in phases other than M, $$AReO \cdot BMeO \cdot (C-x)Fe_2O_3 \cdot xCoO \cdot xTiO_2$$

where x is the extent to which iron ions are substituted by cobalt and titanium ions.

Unless otherwise stated, the proportions of the various substances utilized in the process are calculated strictly according to the stoichiometry of the end-product.

The first step is preparation of a solution of ferric citrate in water, in which the acid moles outnumber the iron by approximately 10 to 1; a solution of the kind is obtained by dissolving nitrate of iron in distilled water, and precipitating ferrous hydroxide with an excess of concentrate ammonia; the precipitate is separated from the solution and washed in lukewarm water until neutral pH is obtained, following which a 1:2 mol solution of citric acid in water is added, such that the citric acid out-proportions the iron as aforesaid. This procedure is adopted in view of the fact that the ferrous hydroxide produced is easily dissolved in citric acid, unlike calcined or dried substances generally available through the trade. Likewise, the use of citric acid is preferred, though not obligatory; any other organic α hydroxy polyacid may be used.

The solution is pre-heated to a temperature of approximately 60°...70° C. so as to dissolve the precipitate completely, following which a carbonate or an oxide of strontium and/or barium and a carbonate or an oxide or a base carbonate of cobalt are added; other soluble compounds of strontium/barium or cobalt may be used, provided that no anions are introduced which cannot be eliminated by the next application of heat. Finally, a solution of titanium trichloride in water is added.

The trivalent titanium is oxidated directly in solution by a redox reaction in which $$Ti^{3+} + Fe^{3+} \rightleftharpoons Ti^{4+} + Fe^{2+}$$

The titanium ion is obtained in solution utilizing titanium trichloride ($TiCl_3$) since the oxygen-bearing compounds of tetravalent titanium ($TiO_2$) are not soluble in the weak acid environment of a citric acid solution. Likewise, titanium tetrachloride ($TiCl_4$) is not suited to the purpose since hydrolysis will occur on contact with the water, producing a hydroxide that is insoluble in citric acid.

As persons skilled in the art will appreciate, if a hexaferrite is required in a phase other than M, the soluble compound of a divalent transition metal must be added, and the proportions of the different components must of course be modified according to the stoichiometric properties of the end-product.

One now has the formation of soluble citrates of the metals introduced, which, besides iron, are strontium and/or barium, cobalt and titanium.

The next step is addition of hydrogen peroxide to the solution in order to oxidate any by-products created as a result of the titanium-and-iron redox reaction; another oxidating agent may be utilized as long as no new chemical elements are introduced into the solution.

At this stage the solution is heated to a temperature of below 100° C. in order to eliminate excess hydrogen peroxide, and carbon dioxide given off by the decomposition of carbonates.

Ethylene glycol (or another polyalcohol) is now added to the solution in a proportion of 10% by volume, approximately; a typical polycondensation occurs between the glycol and the citrate, giving rise to the formation of long organic macromolecules with chemically-bonded inorganic ions.

The solution is heated once again in order to eliminate the water and the azeotropic mixture of $H_2O$ and HCl, which evaporates at 110° C. Following this heating stage one has the formation, in sequence, of a highly viscous organo-metallic residue having the same cationic composition and the same chemical uniformity of the original solution, and of a solidified mass that possesses the same properties; the high viscosity of the long organic macromolecules is such as to permit of their total dehydration without any precipitation occurring, hence without any separation of their components.

A further application of heat at a temperature between 400° and 450° C. burns off, and thus eliminates solid organic matter, leaving an inorganic residue that consists wholly and exclusively of the hexaferrite components (metals introduced, plus oxygen). The residue may be ground at this juncture, before a final application of heat takes place to bring about formation of the hexaferrite end-product.

The uniformity of atomic structure possessed by the precursor is not obtainable with traditional ceramics-preparation techniques, and it is a property which renders the substance considerably more reactive; the result is that formation of the hexaferrite can occur at lower temperature and in a relatively shorter time; a powder produced by this method is smaller-grained, and has enhanced granulometry. The substitution of iron with cobalt and titanium permits of control over the magnetic properties of the end-product, thereby matching exactly it to the ultimate application, which in the case of the disclosure is that of magnetic recording. What is more, it will be observed that the Curie point, (the temperature at which ferromagnetic materials become paramagnetic) remains sufficiently high even with the substitutions as described implemented in practice.

The graph of FIG. 1 demonstrates how magnetization ($\sigma$) and coercive force (Hc) vary, in a heating cycle of five minutes duration at 1050° C., according to the extent, denoted x, to which iron is substituted by titanium and cobalt. The graph of FIG. 2 shows how magnetization and coercive force vary, likewise with variation in the extent of substitution x, in a cycle of two minutes at 1150° C.

In the graph of FIG. 3, it will be seen how in a hexaferrite with a substitution factor of x=0.9, assuming heating cycles of 2, 5 and 30 minutes duration respectively, magnetization and coercive force vary with variation in the temperature at which the final heat cycle is brought about.

It must be stressed, to the end of interpreting the graphs correctly, that the final heat cycle occurs at constant temperature, in theory; also, the graphs relate to a hexaferrite in the M phase wherein a part of the iron is substituted in isoelectronic fashion by cobalt plus titanium, to the extent as denoted by factor x.

What is claimed is:

1. A method for the preparation of fine hexagonal ferrite powders, in particular for magnetic recording, characterised in that it comprises the following steps:
   preparation of a solution of ferric citrate in water having an excess of citric acid over iron;
   addition of a soluble compound of an alkaline earth metal (Re) in stoichiometric proportion determined by the stoichiometry of the end-product;
   addition of a soluble compound of cobalt in stoichiometric proportion determined by the stoichiometry of the end-product;
   addition of a soluble compound of titanium in stoichiometric proportion determined by the stoichiometry of the end-product;
   first application of heat at below 100° C. by means of which to eliminate unwanted by-products;
   addition of ethylene glycol in a proportion of 10% by volume (approx) of the solution with the resultant formation of organic macromolecules having chemically bonded inorganic ions;
   a second application of heat to bring about total dehydration and resultant formation of a solidified mass possessing the same cationic composition and the same chemical uniformity as the original solution;
   a third application of heat at between 400°...450° C., bringing about total elimination of the organic part of the solidified mass; and
   a final application of heat by means of which to induce crystallization of the hexaferrite.

2. Method as in claim 1 wherein the soluble compound of titanium is titanium trichloride ($TiCl_3$).

3. Method as in claim 1 wherein the alkaline earth metal (Re) is strontium and/or barium and the soluble compounds of such metals are carbonates and/or oxides.

4. Method as in claim 1 wherein the soluble compounds of cobalt are neutral or base carbonates and/or oxides.

5. Method as in claim 1 wherein the excess of citric acid over iron is 10 moles to 1 approximately.

6. Method as in claim 1 wherein preparation of the ferric citrate solution comprises the following steps:
solution of nitrate of iron in distilled water and precipitation of ferrous hydroxide with an excess of concentrate ammonia;
separation of the precipitate and washing of same until neutral pH is obtained;
addition of a 1:2 mol solution of citric acid in water.

7. Method as in claim 5 wherein the solution of ferric citrate is pre-heated to between 60° and 70° C. approx until the precipitate is totally dissolved.

8. Method as in claim 1 wherein hydrogen peroxide is added to the solution prior to the first application of heat.

9. Method as in claim 1 wherein the soluble compound of a divalent transition metal is added to the solution of ferric citrate in water.

10. Method as in claim 1 wherein the inorganic residue is ground prior to the final application of heat.

11. Method as in claim 1 comprising the following steps:
solution of nitrate of iron in distilled water and precipitation of ferrous hydroxide with an excess of concentrate ammonia;
separation of the precipitate and washing of same until neutral pH is obtained;
addition of a 1:2 mol solution of citric acid in water such that acid moles outnumber iron moles by approximately 10 to 1;
preliminary application of heat at 60° ... 70° C. approx until the precipitate is totally dissolved;
addition of a carbonate of barium and/or strontium in stoichiometric proportion determined by the stoichiometry of the end-product;
addition of carbonate of cobalt in stoichiometric proportion determined by the stoichiometry of the end-product;
addition of titanium trichloride in stoichiometric proportion determined by the stoichiometry of the end-product;
addition of hydrogen peroxide;
a first application of heat at below 100° C. by means of which to eliminate excess hydrogen peroxide and carbon dioxide produced by decomposition of carbonates;
addition of ethylene glycol in a proportion of 10% by volume (approx) of the solution with the resultant formation of organic macromolecules having chemically bonded inorganic ions;
a second application of heat to bring about total dehydration and resultant formation of a solidified mass possessing the same cationic composition and the same chemical uniformity as the original solution;
a third application of heat at between 400° ... 450° C., bringing about total elimination of the organic part of the solidified mass, so as to leave an inorganic residue;
grinding of the inorganic residue; and
a final application of heat by means of which to induce crystallization of the hexaferrite.

* * * * *